R. I. BURBANK.
Horse Hay-Rake.
No. 88,127. Patented March 23, 1869.
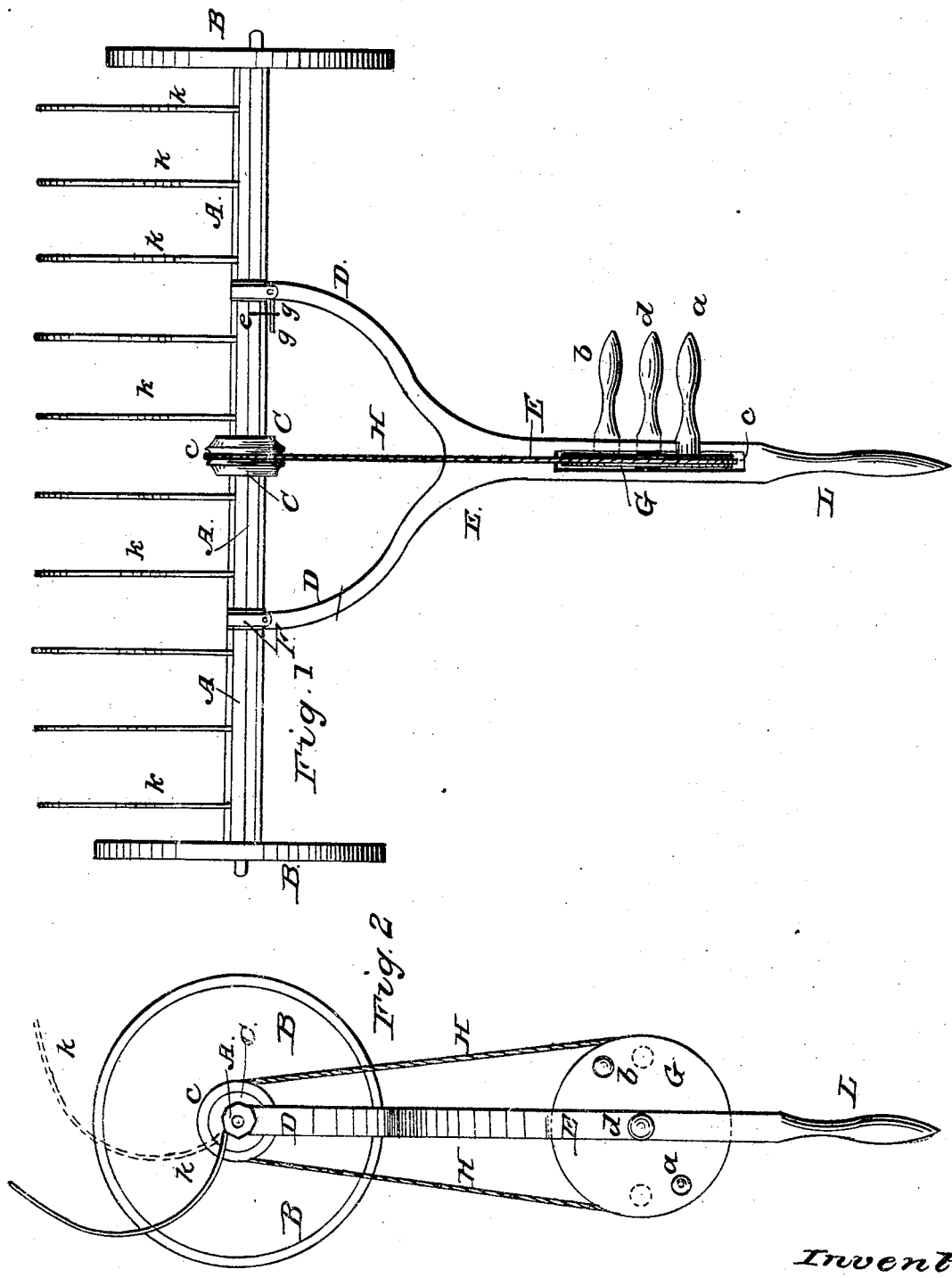

ROBERT I. BURBANK, OF BOSTON, MASSACHUSETTS.

*Letters Patent No. 88,127, dated March 23, 1869.*

IMPROVEMENT IN HAY-RAKES.

The Schedule referred to in these Letters Patent and making part of the same

*To all whom it may concern:*

Be it known that I, ROBERT I. BURBANK, of Boston, in the county of Suffolk, and State of Massachusetts, have invented certain new and useful Improvements in the Rakes which are Used for Raking Hay or Grain by Hand, of which the following is a full, clear, and exact description, reference being had to the accompanying drawings, making part of this specification, in which—

Figure 1 represents a plan, or top view, and

Figure 2, a side elevation, after one wheel, B, has been removed.

This invention relates to certain new and useful improvements in hand, or loafer-rakes, or those which are used for raking hay or grain by hand; and Its object is to enable any person, even a boy or an invalid, who can draw the machine, to rake with the greatest ease, moving and operating the same simply by drawing forward.

In constructing my improved hand-rake, or loafer-rake, I provide a suitable axle, A, to the ends of which I apply wheels, B, and at or near the centre, a pulley, C.

At each side of the aforesaid pulley, and at a suitable distance therefrom, the two forked portions, D, of a draught-tongue, E, are connected with the axle, by clasps, or bands, F, passing around the latter, and fastened to the former, certain bearings or annular grooves having been formed in the axle to receive the clasps, and allow the axle to turn, or oscillate.

A slot is formed in the forward portion of the tongue, and in this slot I arrange a pulley, G, directly in line with the pulley C, on the axle.

The pulley G is provided with handles, $a$ and $b$, by which to draw and operate the rake.

A third handle, $d$, projecting from the side of the tongue, forms a draught-handle, and a pin, or centre-bearing, for the pulley.

An endless belt, or band, H, passes around the two pulleys, as shown, by which to communicate power and motion from one to the other.

The pulleys may be grooved, corrugated, or serrated, to cause the belt, or band to adhere, or pins, $c$, may be inserted in the pulleys, to insure the certain action of the belt, or band; or, if preferred, an endless chain and chain-wheels may be employed, instead of the endless band and the pulleys.

The rake-teeth, K, are inserted in or fastened to the turning, or oscillating axle, in a permanent manner.

A pin, $e$, projects forward from the axle, and a pin, $g$, from the side of one of the forked portions, D, of the tongue, and these two pins form a stop to prevent the axle being turned too far when operating, or working the rake.

In operating, or working this machine, the operator takes his position on that side of the tongue where the handles $a$, $b$, and $d$, project, and, with one hand hold of the end, L, of the tongue, and the other hold of the handle $a$, elevates the teeth and draws the machine forward to the hay-field, and, with the teeth K elevated, moving the machine to the spot and position desired. He then draws by the lower handle, $b$, which operates the pulley G, and, by means of the belt, or band, H, and the pulley C, turns the axle a small part of a revolution. This brings the free ends of the rake-teeth downward, shown by dotted lines in fig. 2, and upon the ground, at the same time causing the machine to move forward while drawing or pressing the teeth firmly under the hay. This will be necessary where the hay is not well dried, the quantity large, and the ground uneven; but if the hay is dry, the quantity small, and the ground even, the teeth will generally press, or drag on the ground, and under the hay, by their own weight, which will be sufficient to insure their certain action.

When a quantity of hay is collected by the teeth, a pull, by the upper handle $a$, will turn the pulleys and the axle, elevate the free ends of the teeth, and dislodge the hay thus collected. Releasing the handle $a$, the ends of the teeth will drop upon the ground, and set in anew. All this is readily done by simply changing the hand from one handle to another, all the time drawing the machine forward.

In the use of this machine, the operator (having raised the teeth, as before described,) is enabled to back the machine up to a fence, a stump, or a tree, then dropping the ends of the teeth, and drawing forward by the handle $b$ or $c$, to rake all the hay lying near such fence, stump, or tree, as easily as from any other part of the field.

All the other operations of the machine are performed by simply drawing straight forward, either by the upper, the lower, or the centre handle, using the end, L, of the tongue to guide, or steer the machine. Thus it will be seen that no power is lost or wasted by pushing backward, upward, or downward, but all the power, or force used in drawing, or in operating, is exerted in one straightforward direction, which I consider very important.

What I claim, is—

The belt, or band, H, and pulleys C and G, the latter provided with handles $a$ and $b$, in combination with the slotted tongue E and the axle A, whereby all the power, or force employed in operating the rake may be exerted in a forward direction, and at the same time as a motive-power, or force, in moving forward the rake itself, for the purpose substantially as described.

R. I. BURBANK.

Witnesses:
P. C. BURBANK,
HENRY F. McKEEVER.